(12) United States Patent
Lee et al.

(10) Patent No.: US 10,239,981 B2
(45) Date of Patent: Mar. 26, 2019

(54) PRESSURE-SENSITIVE ADHESIVE COMPOSITION

(71) Applicant: LG Chem, Ltd., Seoul (KR)

(72) Inventors: Min Ki Lee, Daejeon (KR); No Ma Kim, Daejeon (KR); Jeong Ae Yoon, Daejeon (KR); Sung Soo Yoon, Daejeon (KR); Su Jeong Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/898,307

(22) PCT Filed: Jun. 18, 2014

(86) PCT No.: PCT/KR2014/005373
§ 371 (c)(1),
(2) Date: Dec. 14, 2015

(87) PCT Pub. No.: WO2014/204211
PCT Pub. Date: Dec. 24, 2014

(65) Prior Publication Data
US 2016/0145470 A1    May 26, 2016

(30) Foreign Application Priority Data

Jun. 19, 2013 (KR) .................. 10-2013-0070633

(51) Int. Cl.
| | | |
|---|---|---|
| C09J 7/20 | (2018.01) | |
| C09J 153/00 | (2006.01) | |
| C09J 7/38 | (2018.01) | |
| C09J 175/04 | (2006.01) | |
| C09J 133/08 | (2006.01) | |
| C09J 133/12 | (2006.01) | |
| C08K 5/5415 | (2006.01) | |
| C08F 297/00 | (2006.01) | |
| C09J 133/06 | (2006.01) | |
| C08G 18/62 | (2006.01) | |
| C08F 293/00 | (2006.01) | |
| C08K 5/00 | (2006.01) | |
| G02B 5/30 | (2006.01) | |

(52) U.S. Cl.
CPC ........ *C08F 297/00* (2013.01); *C08F 293/005* (2013.01); *C08G 18/6225* (2013.01); *C09J 7/387* (2018.01); *C09J 133/066* (2013.01); *C09J 133/08* (2013.01); *C09J 133/12* (2013.01); *C09J 153/00* (2013.01); *C09J 175/04* (2013.01); *C08F 2438/01* (2013.01); *C08K 5/0025* (2013.01); *C09J 2201/606* (2013.01); *C09J 2201/622* (2013.01); *C09J 2203/318* (2013.01); *C09J 2205/102* (2013.01); *C09J 2433/00* (2013.01); *C09J 2453/00* (2013.01); *G02B 5/3025* (2013.01)

(58) Field of Classification Search
None
See application file for complete search history.

(56) References Cited

U.S. PATENT DOCUMENTS

| | | | | |
|---|---|---|---|---|
| 5,686,504 A | * | 11/1997 | Ang ................ | C09J 133/08 522/46 |
| 7,863,182 B2 | * | 1/2011 | Matsumura ......... | C09J 7/02 438/628 |
| 2005/0181148 A1 | | 8/2005 | Kim et al. | |
| 2006/0024521 A1 | * | 2/2006 | Everaerts ............ | B32B 7/06 428/522 |
| 2006/0154098 A1 | | 7/2006 | Dollase et al. | |
| 2009/0208739 A1 | * | 8/2009 | Husemann ......... | B32B 17/10018 428/354 |
| 2009/0275705 A1 | | 11/2009 | Fujita et al. | |
| 2011/0007244 A1 | * | 1/2011 | Kim .................. | C08G 18/6229 349/96 |
| 2011/0033720 A1 | | 2/2011 | Fujita et al. | |
| 2012/0070660 A1 | | 3/2012 | Miyazaki et al. | |
| 2014/0066539 A1 | * | 3/2014 | Tobing .............. | C09J 7/0221 522/46 |
| 2014/0322526 A1 | | 10/2014 | Dollase et al. | |
| 2015/0062503 A1 | | 3/2015 | Yoon et al. | |

FOREIGN PATENT DOCUMENTS

| | | |
|---|---|---|
| CN | 102307964 A | 1/2012 |
| CN | 102482550 A | 5/2012 |
| EP | 1572822 A1 | 9/2005 |
| EP | 2366750 A1 | 9/2011 |
| EP | 2889350 A1 | 7/2015 |
| JP | 07-082542 | 3/1995 |
| JP | 2006-282687 A | 10/2006 |
| JP | 2012237965 A | 12/2012 |
| JP | 2016505871 A | 2/2016 |
| KR | 10-0594514 B1 | 6/2006 |
| KR | 2009-0113515 A | 11/2009 |
| KR | 10-1023839 B1 | 3/2011 |
| KR | 10-1171976 B1 | 8/2012 |
| KR | 10-1171977 B1 | 8/2012 |
| WO | 2004050781 A1 | 6/2004 |
| WO | 2010126123 A1 | 11/2010 |
| WO | 2011027707 A1 | 3/2011 |
| WO | 2013057264 A1 | 4/2013 |

OTHER PUBLICATIONS

Aldrich Data Sheet (2017).*
International Search Report for Application No. PCT/KR2014/005373 dated Sep. 25, 2014.
Taiwanese Search Report for Application No. 103121226 dated Apr. 9, 2015.
Extended Search Report from European Application No. 14814068.4, dated Oct. 26, 2016.

* cited by examiner

*Primary Examiner* — Frank D Ducheneaux
(74) *Attorney, Agent, or Firm* — Lerner, David, Littenberg, Krumholz & Mentlik, LLP

(57) ABSTRACT

The present invention relates to a pressure-sensitive adhesive composition. The pressure-sensitive adhesive composition of the present invention exhibits excellent dependability under a high temperature or high humidity condition, and also has excellent stress relaxation property and reworkability when being applied to a polarizing plate, and thus, it can effectively prevent warpage. Accordingly, the pressure-sensitive adhesive composition can be usefully applied for an optical film.

13 Claims, No Drawings

PRESSURE-SENSITIVE ADHESIVE COMPOSITION

CROSS-REFERENCE TO RELATED APPLICATION

This application is a national phase entry under 35 U.S.C. § 371 of International Application No. PCT/KR2014/005373, filed Jun. 18, 2014, which claims priority to Korean Patent Application No. 10-2013-0070633, filed Jun. 19, 2013, the disclosures of which are incorporated herein by reference.

BACKGROUND

1. Field of the Invention

The present invention relates to a pressure-sensitive adhesive composition, an optical laminate, a polarizing plate, and a display device.

2. Discussion of Related Art

Typically, a liquid crystal display device (hereinafter, referred to as "LCD device") includes a liquid crystal panel containing a liquid crystal component injected between two transparent substrates and an optical film. The optical film may include a polarizing film, a retardation film, or a brightness enhancement film.

In order to laminate such optical films or attach the optical film to an adherend such as a liquid crystal panel, a pressure-sensitive adhesive for an optical film is generally used. A pressure-sensitive adhesive may use an acrylic polymer, rubber, a urethane resin, a silicon resin, or an ethylene vinyl acetate (EVA) resin.

As a pressure-sensitive adhesive for an optical film, particularly a polarizing plate, a pressure-sensitive adhesive including an acrylic polymer which has excellent transparency and high resistance to oxidation or yellowing is generally used.

Patent Documents 1 to 3 describe a pressure-sensitive adhesive composition used for an optical film.

Patent Document 1: Korean Patent No. 1023839
Patent Document 2: Korean Patent No. 1171976
Patent Document 3: Korean Patent No. 1171977

SUMMARY OF THE INVENTION

The present invention is directed to a pressure-sensitive adhesive composition, an optical laminate, a polarizing plate, and a display device.

The present invention relates to a pressure-sensitive adhesive composition.

An exemplary pressure-sensitive adhesive composition may include a block copolymer. The term "block copolymer" as used in the present specification may refer to a copolymer including blocks of different polymerized monomers.

In an exemplary embodiment, the block copolymer may include a first block having a glass transition temperature of 50° C. or more and a second block having a glass transition temperature of −10° C. or less. In the present specification, "glass transition temperature of a certain block" in the block copolymer may refer to a glass transition temperature measured from a polymer formed of only monomers included in the block.

In an example, the glass transition temperature of the first block may be 60° C. or more, 65° C. or more, 70° C. or more, or 75° C. or more. Further, the upper limit of the glass transition temperature of the first block is not particularly limited, and may be, for example, about 150° C., about 140° C., about 130° C., or about 120° C.

Further, the glass transition temperature of the second block may be −20° C. or less, −30° C. or less, −35° C. or less, or −40° C. or less. Furthermore, the lower limit of the glass transition temperature of the second block is not particularly limited, and may be, for example, about −80° C., about −70° C., about −60° C., or about −55° C.

The block copolymer including at least the above two blocks may form a micro-phase separation structure within the pressure-sensitive adhesive. Such a block copolymer exhibits adequate cohesion and stress relaxation property depending on a change in temperature and thus can form a pressure-sensitive adhesive that maintains excellent properties required for an optical film such as dependability, light leakage prevention property, and reworkability.

In the block copolymer, the first block may have a number average molecular weight (Mn) in a range of, for example, 2,500 to 150,000. The number average molecular weight of the first block may refer to, for example, a number average molecular weight of a polymer prepared by polymerizing only monomers constituting the first block. The "number average molecular weight" as used in the present specification can be measured by a method suggested in Examples using, for example, a GPC (Gel Permeation Chromatography). In another exemplary embodiment, the number average molecular weight of the first block may be 5,000 to 100,000 or 10,000 to 50,000.

Further, the block copolymer may have a number average molecular weight of 50,000 to 300,000. In another exemplary embodiment, the number average molecular weight of the block copolymer may be about 50,000 to about 250,000, about 50,000 to about 200,000, or about 50,000 to about 150,000.

The block copolymer may have a molecular weight distribution (PDI; Mw/Mn), i.e. a ratio (Mw/Mn) of a weight average molecular weight (Mw) to a number average molecular weight (Mn), in a range of about 1.0 to about 2.5, or about 1.5 to about 2.0. By regulating the molecular weight characteristic as described above, a pressure-sensitive adhesive composition or pressure-sensitive adhesive having excellent properties can be provided.

In an example, the block copolymer may include a thermosetting functional group. The thermosetting functional group may be included only in the second block while a cross-linkable functional group is not included in the first block having a high glass transition temperature. If the thermosetting functional group is included in the second block, the block copolymer exhibits adequate cohesion and stress relaxation property depending on a change in temperature and thus can form a pressure-sensitive adhesive that maintains excellent properties required for an optical film such as dependability, light leakage prevention property, and reworkability.

Monomers of the first block and the second block in the block copolymer are not particularly limited in kind as long as the glass transition temperatures as described above can be obtained by combination of the respective monomers. In an example, the first block may include a (meth)acrylic acid ester monomer as a polymerization unit. In the present specification, a monomer included as a polymerization unit in a polymer or a block may mean that the monomer forms a skeleton, for example, a main chain or a side chain, of the polymer or the block through a polymerization reaction. As the (meth)acrylic acid ester monomer, for example, alkyl (meth)acrylate may be used. For example, in consideration of regulation of cohesion, a glass transition temperature, and a pressure-sensitive adhesive property, alkyl(meth)acrylate including an alkyl group having 1 to 20 carbon atoms, 1 to 16 carbon atoms, 1 to 12 carbon atoms, 1 to 8 carbon atoms, or 1 to 4 carbon atoms may be used. Examples of the monomer may include methyl (meth)acrylate, ethyl (meth) acrylate, n-propyl(meth)acrylate, isopropyl(meth)acrylate, n-butyl (meth)acrylate, t-butyl (meth)acrylate, sec-butyl (meth)acrylate, pentyl(meth)acrylate, 2-ethylhexyl(meth) acrylate, 2-ethylbutyl (meth)acrylate, n-octyl(meth)acrylate, isobornyl(meth)acrylate, isooctyl(meth)acrylate, isononyl (meth)acrylate, or lauryl(meth)acrylate. One or two or more monomers may be selected from the above-described monomers and used such that the above-described glass transition temperature can be obtained. Although not particularly limited, in consideration of easiness in regulation of a glass transition temperature, among the above-described monomers, a methacrylic acid ester monomer such as alkyl methacrylate including an alkyl group having 1 to 20 carbon atoms, 1 to 16 carbon atoms, 1 to 12 carbon atoms, 1 to 8 carbon atoms, or 1 to 4 carbon atoms may be used as the monomer constituting the first block.

The second block of the block copolymer may include an acrylic acid ester monomer and a thermosetting functional group. In this case, the thermosetting functional group may be included as being contained in a copolymerizable monomer in the second block.

In an example, the second block may include 90 to 99.9 parts by weight of an acrylic acid ester monomer and 0.1 to 10 parts by weight of a copolymerizable monomer having a thermosetting functional group as a polymerization unit. In the present specification, the unit "parts by weight" may mean a weight ratio between components. For example, as described above, the second block including 90 to 99.9 parts by weight of an acrylic acid ester monomer and 0.1 to 10 parts by weight of a copolymerizable monomer having a thermosetting functional group as a polymerization unit means that a weight ratio (A:B) of the acrylic acid ester monomer (A) and the copolymerizable monomer (B) having a thermosetting functional group, which form the polymerized unit of the second block, is 90 to 99.9:0.1 to 10. If the copolymerizable monomer having a thermosetting functional group is in an amount of less than 0.01 parts by weight, cohesion decreases, and thus, there may be a problem with durability. If the copolymerizable monomer is in an amount of 10 parts by weight or more, adhesion strength decreases, and thus, there may be a problem with durability.

As the acrylic acid ester monomer constituting the second block, a monomer which can finally obtain a glass transition temperature in the above-described range through copolymerization with the copolymerizable monomer may be selected from the monomers, which can be included in the first block, and used. In consideration of easiness in regulation of a glass transition temperature, although not particularly limited, the acrylic acid ester monomer may employ an acrylic acid ester monomer such as alkyl acrylate including an alkyl group having 1 to 20 carbon atoms, 1 to 16 carbon atoms, 1 to 12 carbon atoms, 1 to 8 carbon atoms, or 1 to 4 carbon atoms from the above-described monomers.

In the present specification, the term "copolymerizable monomer having a thermosetting functional group" refers to a copolymerizable monomer having a thermosetting functional group and also having a portion which can be copolymerized with a (meth)acrylic acid ester monomer. The thermosetting functional group refers to a functional group capable of realizing a cross-linked structure by reaction with the cross-linker under the condition where an adequate amount of heat is applied, such as a drying process or an aging process.

For example, the thermosetting functional group may be a hydroxyl group, a carboxyl group, an amino group, an isocyanate group, or an epoxy group, preferably a hydroxyl group or a carboxyl group. Generally, the portion which can be copolymerized with a (meth)acrylic acid ester monomer is a double bond between carbon atoms, but is not limited thereto.

As for the copolymerizable monomer having a thermosetting functional group, a copolymerizable monomer having a hydroxyl group as a thermosetting functional group may include 2-hydroxyethyl (meth)acrylate, 2-hydroxypropyl(meth)acrylate, 4-hydroxybutyl (meth)acrylate, 6-hydroxyhexyl(meth)acrylate, 8-hydroxyoctyl(meth)acrylate, 2-hydroxyethyleneglycol(meth)acrylate, or 2-hydroxypropyleneglycol(meth)acrylate, and a copolymerizable monomer having a carboxyl group as a thermosetting functional group may include (meth)acrylic acid, 2-(meth)acryloyloxy acetic acid, fumaric acid, itaconic acid, maleic acid, or maleic acid anhydride, but they are not be limited thereto.

If necessary, the first block and/or the second block may further include, for example, any other comonomer in order to regulate a glass transition temperature, and the monomer may be included as a polymerized unit. The comonomer may include nitrogen-containing monomers such as (meth) acrylonitrile, (meth)acrylamide, N-methyl (meth)acrylamide, N-butoxy methyl (meth)acrylamide, N-vinyl pyrrolidone, or N-vinyl caprolactam; alkyleneoxide group-containing monomers such as alkoxy alkyleneglycol(meth) acrylic acid ester, alkoxy dialkyleneglycol(meth)acrylic acid ester, alkoxy trialkyleneglycol(meth)acrylic acid ester, alkoxy tetraalkyleneglycol(meth)acrylic acid ester, alkoxy polyethyleneglycol(meth)acrylic acid ester, phenoxy alkyleneglycol(meth)acrylic acid ester, phenoxy dialkyleneglycol(meth)acrylic acid ester, phenoxy trialkyleneglycol (meth)acrylic acid ester, phenoxy tetraalkyleneglycol(meth) acrylic acid ester, or phenoxy polyalkyleneglycol(meth) acrylic acid ester; styrene-based monomers such as styrene or methyl styrene; glycidyl group-containing monomers such as glycidyl(meth)acrylate; or carboxylic acid vinyl ester such as vinyl acetate, but is not limited thereto. One or two or more comonomers may be appropriately selected and included in a polymer as necessary. Such a comonomer may be included in the block copolymer in an amount of, for example, 20 parts by weight or less, or 0.1 part by weight to 15 parts by weight with respect to the weight of the other monomer in each block.

In an example, the block copolymer may be a diblock copolymer formed of the first block and the second block, i.e. a block copolymer including only two blocks, the first block and the second block. Due to a use of the diblock copolymer, dependability, stress relaxation property, and reworkability of the pressure-sensitive adhesive can be maintained excellent.

The block copolymer may include, for example, 5 to 40 parts by weight of the first block and 60 to 95 parts by weight of the second block. By regulating a weight ratio between the first block and the second block, it is possible to provide a pressure-sensitive adhesive composition and pressure-sensitive adhesive having excellent properties. In another example, the block copolymer may include 5 to 35 parts by weight of the first block and 65 to 95 parts by weight of the second block, or 5 to 30 parts by weight of the first block and 70 to 95 parts by weight of the second block.

A method of preparing the block copolymer is not particularly limited, and the block copolymer can be prepared by a typical method. The block copolymer can be polymerized by a Living Radical Polymerization (LRP) method. Examples of the LRP method include: anionic polymerization using an organic rare-earth metal composite as a polymerization initiator or using an organic alkali metal compound as a polymerization initiator for polymerization in the presence of inorganic acid salts such as salts of alkali metal or alkali earth metal; anionic polymerization using an organic alkali metal compound as a polymerization initiator for polymerization in the presence of an organic aluminum compound; atom transfer radical polymerization (ATRP) using an atom transfer radical polymerization agent as a polymerization control agent; ARGET (Activators Regenerated by Electron Transfer) atom transfer radical polymerization (ATRP) using an atom transfer radical polymerization agent as a polymerization control agent for polymerization in the presence of an organic or inorganic reducing agent that generates electrons; ICAR (Initiators for Continuous Activator Regeneration) atom transfer radical polymerization (ATRP); reversible addition-fragmentation chain transfer (RAFT) polymerization using an inorganic reducing agent and a reversible addition-fragmentation chain transfer agent; or a method using an organic tellurium compound as an initiator. An appropriate method can be selected from the above methods.

The pressure-sensitive adhesive composition may include a multifunctional compound having two or more radical polymerization groups. The multifunctional compound having two or more radical polymerization groups may be multifunctional acrylate.

The multifunctional acrylate is not particularly limited as long as it has two or more radical polymerization groups, and may include, for example, one or more selected from the group consisting of bifunctional acrylates, trifunctional acrylates, tetrafunctional acrylates, pentafunctional acrylates, and hexafunctional acrylates.

Further, the multifunctional acrylate may have a cyclic structure within a molecule. The number of carbon atoms in the multifunctional acrylate is not particularly limited as long as a cyclic structure can be formed and included, and may be, for example, 3 to 20 carbon atoms, 4 to 16 carbon atoms, 5 to 12 carbon atoms, or 6 or 8 carbon atoms.

The cyclic structure included in the acrylate may be any one of a carbocyclic structure or a heterocyclic structure, or a monocyclic or polycyclic structure. Examples of the cyclic structure may include cycloalkyl cyclic structures having 3 to 12 carbon atoms, or 3 to 8 carbon atoms, such as cyclopentane, cyclohexane, or cycloheptane, and one or more cyclic structures, 1 to 5 or 1 to 3 cyclic structures may be included within the acrylate. Further, one or more hetero atoms such as O, S, and N may be included therein. Selecting such acrylate may be advantageous in regulating the modulus of elasticity or durability of the pressure-sensitive adhesive.

The multifunctional acrylate may include, for example, bifunctional acrylates such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, hydroxyl puivalic acid neopentylglycol di(meth)acrylate, dicyclopentanyl di(meth)acrylate, caprolactone modified dicyclopentenyl di(meth)acrylate, ethylene oxide modified di(meth)acrylate, di(meth)acryloxy ethyl isocyanurate, allylated cyclohexyl di(meth)acrylate, tricyclodecane dimethanol(meth)acrylate, dimethylol dicyclopentane di(meth)acrylate, ethylene oxide modified hexahydrophthalic acid di(meth)acrylate, tricyclodecane dimethanol(meth)acrylate, neopentylglycol modified trimethylpropane di(meth)acrylate, adamantane di(meth)acrylate, or 9,9-bis[4-(2-acryloyloxy ethoxy)phenyl]fluorine; trifunctional acrylates such as trimethylolpropane tri(meth)acrylate, dipentaerythritol tri(meth)acrylate, propionic acid modified dipentaerythritol tri(meth)acrylate, pentaerythritol tri(meth)acrylate, propylene oxide modified trimethylolpropane tri(meth)acrylate, trifunctional urethane (meth)acrylate, or tris(meth)acryloxy ethylisocyanurate; tetrafunctional acrylates such as diglycerin tetra(meth)acrylate or pentaerythritol tetra(meth)acrylate; pentafunctional acrylates such as propionic acid modified dipentaerythritol penta (meth)acrylate; and hexafunctional acrylates such as dipentaerythritol hexa(meth)acrylate, caprolactone modified dipentaerythritol hexa(meth)acrylate, or urethane(meth)acrylate (e.g., a reaction product of an isocyanate monomer and trimethylolpropane tri(meth)acrylate). Further, as the multifunctional acrylate, compounds such as urethane acrylates, epoxy acrylates, polyester acrylates, or polyether acrylates, which are known as so-called photocurable oligomers in the field, may be used. One or a mixture of at least two appropriately selected from the above-described compounds may be used.

The multifunctional acrylate may be included in the pressure-sensitive adhesive composition in an amount of 1 part by weight to 20 parts by weight, 2.5 parts by weight to 17.5 parts by weight, or 5 parts by weight to 15 parts by weight with respect to 100 parts by weight of the block copolymer. Since the multifunctional acrylate is included in the block copolymer in the above-described range, as an appropriate addition effect of the multifunctional acrylate, it is possible to provide a pressure-sensitive adhesive having excellent durability, particularly high temperature-resistant durability, and excellent light leakage prevention property under severe conditions such as a high temperature condition, a high temperature and high humidity condition, and/or a condition where a high temperature/high humidity and a normal temperature/low humidity are repeated.

The pressure-sensitive adhesive composition may further include a multifunctional cross-linker which can react with a thermosetting functional group so as to cross-link the block copolymer.

As the multifunctional cross-linker, there may be used a cross-linker having at least two functional groups which can react with the thermosetting functional group included in the block copolymer. Examples of the multifunctional cross-linker may include an isocyanate cross-linker, an epoxy cross-linker, an aziridine cross-linker, or a metal chelate cross-linker, and for example, an isocyanate cross-linker may be used.

The isocyanate cross-linker may include, for example, diisocyanate compounds such as tolylene diisocyanate, xylene diisocyanate, diphenylmethane diisocyanate, hexamethylene diisocyanate, isoboron diisocyanate, tetramethylxylene diisocyanate, or naphthalene diisocyanate, or compounds obtained by reacting the above-described diisocyanate compounds with a polyol. The polyol may include, for example, trimethylolpropane.

One or two or more of the above cross-linkers may be used in the pressure-sensitive adhesive composition, but available cross-linkers are not limited thereto.

The multifunctional cross-linker may be included in an amount of, for example, 0.01 part by weight to 20 parts by weight, or 0.01 part by weight to 10 parts by weight, with respect to 100 parts by weight of the block copolymer. In this range, a gel fraction, cohesion, adhesion strength, and durability of the pressure-sensitive adhesive can be maintained excellent.

Further, the pressure-sensitive adhesive composition according to the present invention may further include a radical polymerization initiator in order to efficiently induce a radical polymerization reaction of the radical polymerization group included in the multifunctional acrylate.

The radical polymerization initiator may be, for example, at least one selected from the group consisting of benzoin, benzoin methyl ether, benzoin ethyl ether, benzoin isopropyl ether, benzoin n-butyl ether, benzoin isobutyl ether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-on, 1-hydroxycyclohexyl phenyl ketone, 2-methyl-1-[4-(methylthio)phenyl]-2-morpholino-propane-1-on, 4-(2-hydroxyethoxy)phenyl-2-(hydroxy-2-propyl)ketone, benzophenone, p-phenylbenzophenone, 4,4'-diethyl aminobenzophenone, dichlorobenzophenone, 2-methyl anthraquinone, 2-ethylanthraquinone, 2-t-butyl anthraquinone, 2-amino anthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylamino benzoic acid ester, oligo [2-hydroxy-2-methyl-1-[4-(1-methylvinyl)phenyl]propanone], and 2,4,6-trimethylbenzoyl-diphenyl-phosphineoxide, but it is not limited thereto.

In an example, the radical polymerization initiator may be included in an amount of 0.01 part by weight to 10 parts by weight, 0.05 part by weight to 5 parts by weight, or 0.1 part by weight to 3 parts by weight with respect to 100 parts by weight of the block copolymer. By regulating an amount of the radical polymerization initiator within the above-described range, properties such as dependability and transparency can be maintained excellent.

The pressure-sensitive adhesive composition according to the present invention may further include a silane coupling agent. As the silane coupling agent, there may be used a silane coupling agent having, for example, a β-cyano group or an acetoacetyl group. Such a silane coupling agent may enable a pressure-sensitive adhesive formed of a copolymer having a low molecular weight to exhibit excellent adhesion and adhesion stability and also to maintain excellent dependability under a heat-resistant and wet heat-resistant condition.

As the silane coupling agent having a β-cyano group or an acetoacetyl group, there may be used a compound expressed by, for example, the following Chemical Formula 1 or 2.

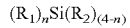    [Chemical Formula 1]

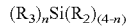    [Chemical Formula 2]

In the above Chemical Formula 1 or 2, $R_1$ represents a β-cyanoacetyl group or a β-cyanoacetylalkyl group, $R_3$ represents an acetoacetyl group or an acetoacetylalkyl group, $R_2$ represents an alkoxy group, and n represents a number of 1 to 3.

In the Chemical Formula 1 or 2, the alkyl group may be an alkyl group having 1 to 20 carbon atoms, 1 to 16 carbon atoms, 1 to 12 carbon atoms, 1 to 8 carbon atoms, or 1 to 4 carbon atoms, and such an alkyl group may be a straight chain, branched chain, or cyclic alkyl group.

Further, in the Chemical Formula 1 or 2, the alkoxy group may be an alkoxy group having 1 to 20 carbon atoms, 1 to 16 carbon atoms, 1 to 12 carbon atoms, 1 to 8 carbon atoms, or 1 to 4 carbon atoms, and such an alkoxy group may be a straight chain, branched chain, or cyclic alkoxy group.

In the above chemical formula 1 or 2, the n may be, for example, 1 to 3, 1 to 2, or 1.

The compound of the Chemical Formula 1 or 2 may include, for example, acetoacetylpropyl trimethoxy silane, acetoacetylpropyl triethoxy silane, β-cyanoacetylpropyl trimethoxy silane, or β-cyanoacetylpropyl triethoxy silane, but is not limited thereto.

The silane coupling agent in the pressure-sensitive adhesive composition may be included in an amount of 0.01 part by weight to 5 parts by weight or 0.01 part by weight to 1 part by weight with respect to 100 parts by weight of the block copolymer. In this range, the silane coupling agent may function to effectively endow a pressure-sensitive adhesive with desired physical properties.

The pressure-sensitive adhesive composition may further include a tackifier, as necessary. For example, the tackifier may include a hydrocarbon resin or a hydrogenated product thereof, a rosin resin or a hydrogenated product thereof, a rosin ester resin or a hydrogenated product thereof, a terpene resin or a hydrogenated product thereof, a terpene phenol resin or a hydrogenated product thereof, a polymerized rosin resin, or polymerized rosin ester resin, which may be used alone or in combination, but is not limited thereto. In the pressure-sensitive adhesive composition, the tackifier may be included in an amount of 100 parts by weight or less with respect to 100 parts by weight of the block copolymer.

Further, if necessary, the pressure-sensitive adhesive composition may further include at least one additive selected from the group consisting of an epoxy resin, a curing agent, a UV stabilizer, an antioxidant, a coloring agent, a reinforcing agent, a filler, an antifoaming agent, a surfactant, and a plasticizer.

In addition, the pressure-sensitive adhesive composition may have a gel fraction of 80 weight % or less after a cross-linked structure is realized. The gel fraction can be calculated from the following General Formula 1:

Gel fraction(%)=$B/A$×100        [General Formula 1]

In the General Formula 1, A represents a mass of the pressure-sensitive adhesive composition in which a cross-linked structure is realized, and B represents a dry weight of a non-dissolved parts obtained after putting the pressure-sensitive adhesive composition, of which a weight is A, in a 200-mesh net and immersing it in ethyl acetate at room temperature for 72 hours.

When the gel fraction is maintained at 80 weight % or less, excellent workability, dependability, and reworkability can be maintained. The lower limit of the gel fraction of the pressure-sensitive adhesive composition is not particularly limited, and may be, for example, 0 weight %. However, a gel fraction of 0 weight % does not mean that cross-linking is not carried out at all in the pressure-sensitive adhesive composition. For example, a pressure-sensitive adhesive composition having a gel fraction of 0 weight % may include a pressure-sensitive adhesive composition in which cross-linking is not carried out at all or a pressure-sensitive adhesive composition in which cross-linking is carried out to some degree but the degree of cross-linking is low, and thus, gel is not maintained in the 200-mesh net but may leak from the net.

The pressure-sensitive adhesive composition may be a pressure-sensitive adhesive composition for an optical film. The pressure-sensitive adhesive composition for an optical film can be used for laminating optical films such as a polarizing film, a retardation film, an anti-glare film, a compensation film for wide angular field of view, or a brightness enhancement film or for attaching the optical film or its laminate to an adherend such as a liquid crystal panel. In an example, the pressure-sensitive adhesive composition may be a pressure-sensitive adhesive composition for a polarizing plate and may be used for attaching a polarizing film to a liquid crystal panel.

The present invention relates to a pressure-sensitive adhesive optical laminate. The pressure-sensitive adhesive optical laminate may include, for example, an optical film; and a pressure-sensitive adhesive layer formed on one or both surfaces of the optical film. The pressure-sensitive adhesive layer may be a pressure-sensitive adhesive layer for attaching the optical film to a liquid crystal panel of an LCD device or another optical film. Further, the pressure-sensitive adhesive layer may contain the above-described pressure-sensitive adhesive composition of the present invention. The pressure-sensitive adhesive composition may be included in the pressure-sensitive adhesive layer in the state where a cross-linked structure is realized. The optical film may include, for example, a polarizing film, a retardation film, a brightness enhancement film, or a laminate of two or more of these films.

Further, the present invention relates to a pressure-sensitive adhesive polarizing plate. The polarizing plate may have, for example, a structure in which an optical film of the pressure-sensitive adhesive optical laminate is a polarizing film.

The polarizing film included in the polarizing plate is not particularly limited in kind, and may employ general polarizing films well known in the art, such as a polyvinylalcohol-based polarizing film without limitation.

The polarizing film is a functional film capable of extracting only light vibrating in one direction from incident light vibrating in various directions. For example, in the polarizing film, a dichroic dye may be adsorbed and arranged to a polyvinylalcohol-based resin film. The polyvinylalcohol-based resin constituting the polarizing film may be obtained by, for example, gelating a polyvinylacetate-based resin. In this case, the polyvinylacetate-based resin to be used may also include vinyl acetate and a copolymer of another monomer capable of being copolymerized with the vinyl acetate as well as a homopolymer of the vinyl acetate. The monomer capable of being copolymerized with the vinyl acetate may be, but is not limited to, one or a mixture of at least two of unsaturated carbonic acids, olefins, vinylethers, unsaturated sulfonic acids, and acrylamides having an ammonium group. The degree of gelation of the polyvinylalcohol-based resin may be typically about 85 mol % to about 100 mol %, and preferably 98 mol % or more. The polyvinylalcohol-based resin may be further modified, and may be, for example, polyvinylformal or polyvinylacetal modified with an aldehyde. The degree of polymerization of the polyvinylalcohol-based resin may be typically about 1,000 to about 10,000, or about 1,500 to about 5,000.

The polarizing film may be manufactured through stretching a polyvinylalcohol-based resin film (e.g., uniaxial stretching), dying the polyvinylalcohol-based resin film with a dichroic dye, adsorbing the dichroic dye, treating the polyvinylalcohol-based resin film to which the dichroic dye is adsorbed with a boric acid aqueous solution, and then washing the polyvinylalcohol-based resin film. As the dichroic dye, iodine or a dichroic organic pigment may be used.

The polarizing plate may further include a protection film attached to one or both surfaces of the polarizing film, and in this case, the pressure-sensitive adhesive layer may be formed on one surface of the protection film. The protection film is not specifically limited in kind, and thus may include: a cellulose-based film formed of, for example, triacetyl cellulose (TAC); a polyester-based film such as a polycarbonate film or a poly(ethylene terephthalate) (PET) film; a polyethersulfone-based film; or a film having one layer or two or more layers of a laminated structure having a polyethylene film, a polypropylene film, and a polyolefin-based film prepared using a resin having a cyclo-based or norbornene structure or an ethylene-propylene copolymer.

The polarizing plate may further include at least one functional layer selected from the group consisting of a protection layer, a reflective layer, an anti-glare layer, a retardation plate, a compensation film for wide angular field of view, and a brightness enhancement film.

In the present invention, a method of forming a pressure-sensitive adhesive layer on the polarizing plate or the optical film is not specifically limited. For example, there may be used a method of directly coating and curing the pressure-sensitive adhesive composition on the polarizing plate or the optical film so as to realize a cross-linked structure, or a method of coating and curing the pressure-sensitive adhesive composition to a release-treated surface of a releasable film so as to form a cross-linked structure and transferring the resultant composition onto the polarizing plate or the optical film.

A method of coating a pressure-sensitive adhesive composition is not specifically limited, and may include, for example, a method of applying a pressure-sensitive adhesive composition using a typical means such as a bar coater.

For uniform coating, a multifunctional cross-linker included in the pressure-sensitive adhesive composition may be preferably controlled not to perform a cross-linking reaction of functional groups during the coating process. Accordingly, a cross-linked structure may be formed in a curing and aging process of the cross-linker after the coating process, and thus, cohesion of the pressure-sensitive adhesive may be improved, and also, adhesive properties and cuttability may be improved.

Further, preferably, the coating process may be performed after a volatile component or a bubble-forming component such as reaction residue in the pressure-sensitive adhesive composition is sufficiently removed. Accordingly, it is possible to prevent problems that the modulus of elasticity of the pressure-sensitive adhesive is decreased due to excessively low cross-linking density or molecular weight, and that bubbles present between a glass plate and a pressure-sensitive adhesive layer become larger at a high temperature, thereby forming a scatterer therein.

A method of curing the pressure-sensitive adhesive composition to realize a cross-linked structure after the coating process is not particularly limited. For example, a curing process may be carried out by maintaining the coating layer at an adequate temperature so as to cause a cross-linking reaction between the block copolymer and the multifunctional cross-linker included within the coating layer.

Furthermore, the present invention relates to a display device, for example, an LCD device. The display device may include, for example, a liquid crystal panel; and the polarizing plate or optical laminate attached to one or both surfaces of the liquid crystal panel. The polarizing plate or optical laminate may be attached to the liquid crystal panel with the above-described pressure-sensitive adhesive.

As a liquid crystal panel in the display device, a well-known panel such as a passive matrix-type panel including a twisted nematic (TN) panel, a super twisted nematic (STN) panel, a ferroelectric (F) panel, or a polymer dispersed (PD)

panel; an active matrix-type panel including a two or three terminal panel; an in-plane switching (IPS) panel; and a vertical alignment (VA) panel may be used.

The other components of the liquid crystal display device, for example, a color filter substrate or an upper and lower substrate such as an array substrate, are not specifically limited in kind, and a conformation well known in the art may be employed without limitation.

Effect on the Invention

The pressure-sensitive adhesive composition of the present invention exhibits excellent dependability under a high temperature or high humidity condition, and also has excellent stress relaxation property and reworkability when being applied to a polarizing plate, and thus, it can effectively prevent warpage. Accordingly, the pressure-sensitive adhesive composition can be usefully applied for an optical film.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Hereinafter, a pressure-sensitive adhesive composition will be described in detail with reference to Examples and Comparative Examples, but a range of the pressure-sensitive adhesive composition is not limited by the following Examples and Comparative Examples.

1. Evaluation of Molecular Weight

A number average molecular weight (Mn) and a molecular weight distribution (PDI) were measured using a GPC under the following conditions. To prepare a calibration curve, measurement results were converted using standard polystyrene produced by Agilent System.

<Measurement Conditions>
Gauge: Agilent GPC (Agilent 1200 series, U.S.)
Column: Two PL Mixed Bs connected
Column Temperature: 40° C.
Eluent: THF (Tetrahydrofuran)
Flow Rate: 1.0 mL/min
Concentration: About 1 mg/mL (100 μL injection)

2. Measurement of Storage Modulus of Elasticity

A pressure-sensitive adhesive layer having a thickness of about 25 μm was obtained by irradiating UV to a pressure-sensitive adhesive between release films and aging the pressure-sensitive adhesive under constant temperature/humidity conditions (23° C., 50% RH) for 7 days. The pressure-sensitive adhesive between release films was prepared as a columnar sample having a size of 8 mm×1 mm, and a storage modulus of elasticity of the sample between parallel plates was measured using a dynamic rheometer (ARES, RDA, manufactured by TA Instruments) at a frequency of 1 Hz while applying a shear stress.

3. Evaluation of Heat-Resistant, High Temperature-Resistant and Wet Heat-Resistant Durability Polarizing plates prepared in Examples and Comparative Examples were cut into pieces having a width of about 180 mm and a length of about 320 mm to prepare samples. The samples were attached to a 19-inch commercially available panel. Then, the panel was kept in an autoclave (50° C., 5 atm) for about 20 minutes to prepare samples. The heat-resistant durability of the prepared samples was evaluated according to the following evaluation criteria after the samples were kept at 80° C. for 500 hours and appearance of bubbles and peels were observed, the high temperature-resistant durability was evaluated according to the following evaluation criteria after the samples were kept at 100° C. for 500 hours and appearance of bubbles and peels were observed, and the wet heat-resistant durability was evaluated according to the following evaluation criteria after the samples were left at 60° C. with a relative humidity of 90% for 500 hours and then appearance of bubbles and peels at a pressure-sensitive adhesive interface were observed:

<Evaluation Criteria>
A: Bubbles and peels are not generated.
B: Bubbles and/or peels are slightly generated.
C: Bubbles and/or peels are highly generated.

4. Calculation of Glass Transition Temperature

Glass transition temperatures Tg of the respective blocks of the block copolymer were calculated according to the following Equation:

$$1/Tg = \Sigma Wn/Tn \quad \text{<Equation>}$$

In the above Equation, Wn represents a weight fraction of a monomer used in each block, and Tn represents a glass transition temperature when the monomer used forms a homopolymer.

That is, the right hand side in the above Equation is the sum of values (Wn/Tn) of respective monomers calculated by dividing a weight fraction of a monomer used by a glass transition temperature when the monomer forms a homopolymer.

5. Measurement of Conversion Rate and Composition Ratio of Monomer

Conversion rates of methyl methacrylate (MMA) as a main monomer constituting a first block and butyl acrylate (BA) as a main monomer constituting a second block during polymerization in block copolymers of Examples and Comparative Examples and composition contents thereof in the block copolymers were calculated according to the following Equation based on a result of 1H-NMR.

<MMA Conversion Rate>

$$\text{MMA Conversion Rate}(\%) = 100 \times B/(A+B)$$

In the above Equation, A represents an area of a peak (around 3.4 ppm to 3.7 ppm) derived from a methyl group induced from MMA included in the polymer in the 1H-NMR spectrum, and B represents an area of a peak (around 3.7 ppm) derived from a methyl group of unpolymerized MMA. That is, a conversion rate of the monomer was calculated in consideration of a movement position of the methyl group peak in the MMA structure.

<BA Conversion Rate>

$$\text{BA Conversion Rate}(\%) = 100 \times C/(C+D)$$

In the above Equation, D represents an area of a peak (around 5.7 ppm to 6.4 ppm) derived from $=CH_2$ at a double bond terminal of BA in the 1H-NMR spectrum, and C represents an area of a peak (around 3.8 ppm to 4.2 ppm) derived from $-OCH_2-$ present in the polymer formed by polymerization of BA. That is, a conversion ratio of BA was measured by calculating relative values of the $=CH_2$ peak of BA and the $-OCH_2-$ peak of the polymer.

<Calculation of Composition Ratio>

A ratio between a first block and a second block in a block copolymer was calculated according to the following Equation based on a ratio between methyl methacrylate (MMA)

and butyl acrylate (BA) as main monomers constituting the first block and the second block, respectively.

MMA Content(%) in Block Copolymer=100×MMA Peak Area/BA Peak Area   <Equation> 5

In the above Equation, the MMA peak area is an area per 1H proton of the peak (peak observed due to —CH$_3$ derived from MMA) around 3.4 ppm to 3.7 ppm in the 1H-NMR, and the BA peak area is an area per 1H proton of the peak (peak observed due to —OCH$_2$— present in the polymer formed of BA) around 3.8 ppm to 4.2 ppm in the 1H-NMR.

That is, a weight ratio between the first and second blocks was calculated by calculating relative values of the —CH$_3$ peak of the MMA structure and the —OCH$_2$— peak of the polymer formed of BA.

6. Evaluation of Transparency

Each of the pressure-sensitive adhesive compositions prepared in Examples and Comparative Examples was coated onto a release-treated surface of a 38 μm-thick PET (poly(ethyleneterephthalate)) film (MRF-38 manufactured by Mitsubishi Corporation) release-treated so that a thickness after drying could be about 40 μm, and kept at 110° C. for about 3 minutes in an oven. Then, transparency of the coated pressure-sensitive adhesive layer was observed with the naked eye and evaluated according to the following evaluation criteria.

<Evaluation Criteria>

A: A coated layer is very transparent.

B: A coated layer is slightly transparent, opaque, or extremely opaque.

Preparation Example 1. Preparation of Block Copolymer (A1)

0.12 g of EBiB (ethyl 2-bromoisobutyrate) and 14.2 g of methyl methacrylate (MMA) were mixed with 6.2 g of ethyl acetate (EAc). A flask of the mixture was sealed with a rubber film, and the mixture was nitrogen-purged and stirred at about 25° C. for about 30 minutes. Then, dissolved oxygen was removed by bubbling. Then, 0.0025 g of CuBr$_2$, 0.006 g of TPMA (tris(2-pyridylmethyl)amine), and 0.019 g of V-65 (2,2'-azobis(2,4-dimethyl valeronitrile)) were added to the mixture from which oxygen was removed, and the resultant mixture was immersed in a reactor at about 67° C. to initiate a reaction (polymerization of a first block). At the time when a conversion rate of methyl methacrylate was about 75%, a mixture of 115 g of butyl acrylate (BA) previously undergoing bubbling with nitrogen, 0.8 g of hydroxybutyl acrylate (HBA), and 250 g of ethyl acetate (EAc) was added thereto in the presence of nitrogen. Then, 0.006 g of CuBr$_2$, 0.01 g of TPMA, and 0.05 g of V-65 were put into the reaction flask to carry out a chain extension reaction (polymerization of a second block). When a conversion rate of the monomer (BA) reached 80% or more, the reaction mixture was exposed to oxygen and diluted in an adequate solvent to terminate the reaction, thereby preparing a block copolymer (In the above process, V-65 was appropriately added in installments in consideration of its half-life until the reaction was terminated.).

Preparation Example 2. Preparation of Block Copolymer (B1)

A block copolymer was prepared in the same manner as Preparation Example 1 except that a weight ratio of a first block and a second block was controlled as shown in the following Table 1.

TABLE 1

| | | Block copolymer | |
|---|---|---|---|
| | | A1 | B1 |
| First block | MMA ratio | 90 | 90 |
| | BMA ratio | 10 | 10 |
| | Tg (° C.) | 90 | 90 |
| | Mn (×10000) | 3.5 | 3.5 |
| | PDI | 1.34 | 1.34 |
| Second block | BA ratio | 97 | 97 |
| | HBA ratio | 1.5 | 1.5 |
| | Tg (° C.) | −45 | −45 |
| Block copolymer | Mn (×10000) | 10.6 | 12.2 |
| | PDI | 1.8 | 1.9 |
| | First block:Second block (Weight ratio) | 10.1:89.9 | 40.5:59.5 |

Monomer ratio unit: part by weight
MMA: methyl methacrylate (Homopolymer Tg: about 110° C.)
BMA: butyl methacrylate (Homopolymer Tg: about 27° C.)
BA: butyl acrylate (Homopolymer Tg: about −45° C.)
HBA: 4-hydroxybutyl acrylate (Homopolymer Tg: about −80° C.)
Tg: glass transition temperature
Mn: number average molecular weight
PDI: molecular weight distribution Example 1

Preparation of Coating Solution (Pressure-Sensitive Adhesive Composition)

A coating solution (pressure-sensitive adhesive composition) was prepared by mixing 7 parts by weight of tris methacryloxy ethylisocyanurate as a multifunctional compound, 0.2 parts by weight of hydroxycyclohexyl phenyl ketone (Irgacure 184, produced by BASF) as a photoinitiator, 0.04 parts by weight of a cross-linker (Coronate L, produced by NPU, Japan), 0.1 parts by weight of DBTDL (Dibutyltin dilaurate), and 0.2 parts by weight of a silane coupling agent having a β-cyanoacetyl group with respect to 100 parts by weight of the block copolymer (A1) prepared in Preparation Example 1, and mixing the resultant mixture with ethyl acetate as a solvent.

Preparation of Pressure-Sensitive Adhesive Polarizing Plate

The prepared coating solution was coated onto a release-treated surface of a 38 μm-thick PET (poly(ethyleneterephthalate)) film (MRF-38 manufactured by Mitsubishi Corporation) release-treated so that a thickness after drying could be about 23 μm, and kept at 110° C. for about 3 minutes in an oven. A pressure-sensitive adhesive polarizing plate was prepared by laminating the coating layer formed on the release-treated PET film on a WV (Wide View) liquid crystal layer of a polarizing plate (TAC/PVA/TAC-laminated structure: TAC=triacetylcellulose, PVA=polyvinylalcohol-based polarizing film), of which one surface was coated with the WV liquid crystal layer, after drying.

Example 2 and Comparative Examples 1 to 4

A pressure-sensitive adhesive composition (coating solution) and a pressure-sensitive adhesive polarizing plate were prepared in the same manner as Example 1 except that each component and a ratio were regulated as shown in the following Table 2 when the pressure-sensitive adhesive composition (coating solution) was prepared.

TABLE 2

|  |  | Example | | Comparative Examples | | | |
|---|---|---|---|---|---|---|---|
|  |  | 1 | 2 | 1 | 2 | 3 | 4 |
| Block copolymer | Kind | A1 | A1 | A1 | B1 | B1 | B1 |
|  | Content | 100 | 100 | 100 | 100 | 100 | 100 |
| MFA content | | 7 | 10 | — | 20 | 15 | — |
| Photoinitiator content | | 0.2 | 0.2 | — | 0.2 | 1.0 | — |
| Cross-linker content | | 0.04 | 0.03 | 0.04 | 0.04 | 0.04 | 0.03 |
| DBTDL content | | 0.1 | 0.1 | 0.1 | 0.1 | 0.1 | 0.1 |
| SCA content | | 0.2 | 0.2 | 0.2 | 0.2 | 0.2 | 0.2 |

Content unit: part by weight
MFA: tris(meth)acryloxy ethyl isocyanurate
Photoinitiator: hydroxycyclohexyl phenyl ketone (Irgacure 184, produced by BASF)
Cross-linker: Coronate L, produced by NPU, Japan
DBTDL: dibutyltin dilaurate
SCA: silane coupling agent having a β-cyanoacetyl group (M812, produced by LG Chem.)

Property evaluation results of the respective Examples and Comparative Examples are as shown in the following Table 3.

TABLE 3

|  | Example | | Comparative Examples | | | |
|---|---|---|---|---|---|---|
|  | 1 | 2 | 1 | 2 | 3 | 4 |
| Storage modulus of elasticity (unit: MPa) | 0.07 | 0.09 | 0.04 | 0.21 | 0.17 | 0.10 |
| Heat-resistant durability | A | A | A | A | A | A |
| High temperature-resistant durability | A | A | C | C | C | A |
| Humidity-resistant durability | A | A | A | C | B | C |
| Transparency | ○ | ○ | ○ | ○ | ○ | ○ |

What is claimed is:

1. A pressure-sensitive adhesive composition comprising:
a block copolymer including 5 parts by weight to 40 parts by weight of a first block having a glass transition temperature of 50° C. or more, and 60 parts by weight to 95 parts by weight of a second block having a glass transition temperature of −10° C. or less; and a multifunctional compound having two or more radical polymerization groups,
wherein the first block consists of an alkyl (meth)acrylate monomer as a polymerization unit, and the second block comprises 90 to 99.9 parts by weight of an acrylic acid ester monomer and 0.1 to 10 parts by weight of a copolymerizable monomer having a thermosetting functional group as a polymerization unit, and wherein the multifunctional compound is a multifunctional acrylate comprising a cyclic structure.

2. The pressure-sensitive adhesive composition of claim 1, wherein the block copolymer is a diblock copolymer including the first block and the second block.

3. The pressure-sensitive adhesive composition of claim 1, further comprising a multifunctional cross-linker having two or more functional groups capable of reacting with a thermosetting functional group.

4. The pressure-sensitive adhesive composition of claim 3, wherein the multifunctional cross-linker is an isocyanate cross-linker, an epoxy cross-linker, an aziridine cross-linker or a metal chelate cross-linker.

5. The pressure-sensitive adhesive composition of claim 3, wherein the multifunctional cross-linker is comprised in an amount of 0.01 part by weight to 20 parts by weight, relative to 100 parts by weight of the block copolymer.

6. The pressure-sensitive adhesive composition of claim 1, further comprising a radical polymerization initiator.

7. The pressure-sensitive adhesive composition of claim 6, wherein the radical polymerization initiator is comprised in an amount of 0.01 part by weight to 10 parts by weight, relative to 100 parts by weight of the block copolymer.

8. The pressure-sensitive adhesive composition of claim 1, wherein the multifunctional compound is comprised in an amount of 1 part by weight to 20 parts by weight, relative to 100 parts by weight of the block copolymer.

9. The pressure-sensitive adhesive composition of claim 1, wherein after a cross-linked structure is realized, a gel fraction is 80 weight % or less.

10. A pressure-sensitive adhesive optical laminate comprising:
an optical film; and a pressure-sensitive adhesive layer which is formed on one or both surfaces of the optical film, and comprises the cross-linked pressure-sensitive adhesive composition of claim 1.

11. A display device comprising the pressure-sensitive adhesive optical laminate of claim 10.

12. A pressure-sensitive adhesive polarizing plate comprising:
a polarizing film; and a pressure-sensitive adhesive layer which is formed on one or both surfaces of the polarizing film, and comprises the cross-linked pressure-sensitive adhesive composition of claim 1.

13. A display device comprising the pressure-sensitive adhesive polarizing plate of claim 12, which is attached to one or both surfaces of a liquid crystal panel.

* * * * *